United States Patent
Baucé et al.

(10) Patent No.: US 10,030,703 B2
(45) Date of Patent: Jul. 24, 2018

(54) MAGNETIC BEARING, APPARATUS COMPRISING SUCH A MAGNETIC BEARING AND METHOD FOR MANUFACTURING SUCH A MAGNETIC BEARING

(71) Applicants: Yvon Baucé, Les Higues (FR); Francis Bienaime, Mont Saint-Aignan (FR); Eduardo Carrasco, Saint Etienne sous Bailleul (FR)

(72) Inventors: Yvon Baucé, Les Higues (FR); Francis Bienaime, Mont Saint-Aignan (FR); Eduardo Carrasco, Saint Etienne sous Bailleul (FR)

(73) Assignee: SKF MAGNETIC MECHATRONICS, Rue des Champs, Saint-Marcel (FR)

( * ) Notice: Subject to any disclaimer, the term of this patent is extended or adjusted under 35 U.S.C. 154(b) by 329 days.

(21) Appl. No.: 14/946,790

(22) Filed: Nov. 20, 2015

(65) Prior Publication Data

US 2016/0153492 A1    Jun. 2, 2016

(30) Foreign Application Priority Data

Nov. 27, 2014    (EP) .................................. 14306909

(51) Int. Cl.
F16C 32/04    (2006.01)
F16C 43/00    (2006.01)
(Continued)

(52) U.S. Cl.
CPC ........ *F16C 32/0482* (2013.01); *F04D 29/058* (2013.01); *F16C 32/047* (2013.01); *F16C 32/0446* (2013.01); *F16C 32/0461* (2013.01); *F16C 43/00* (2013.01); *H01F 5/02* (2013.01); *H01F 7/06* (2013.01); *F16C 2360/45* (2013.01); *H01R 4/2416* (2013.01)

(58) Field of Classification Search
CPC .......................... F16C 32/048; F16C 32/0446; F16C 32/0461; F16C 32/047
USPC ........................................................ 310/90.5
See application file for complete search history.

(56) References Cited

U.S. PATENT DOCUMENTS

| | | |
|---|---|---|
| 3,359,520 A | 12/1967 | Foerster |
| 4,500,142 A | 2/1985 | Brunet |

(Continued)

FOREIGN PATENT DOCUMENTS

| | | |
|---|---|---|
| DE | 3910769 A1 | 10/1990 |
| DE | 202010016199 U1 | 2/2011 |

(Continued)

*Primary Examiner* — Jeremy Luks
(74) *Attorney, Agent, or Firm* — Bryan Peckjian; SKF USA Inc. Patent Dept.

(57) ABSTRACT

A magnetic bearing, comprising: a magnetic base; at least three actuator bobbins mounted on the magnetic base; and magnetic sensors associated with the actuator bobbins. At least one magnetic system amidst the magnetic actuators and the magnetic sensors comprises together: a coil holder; a coil wound up around the coil holder; and a connector device integrated to the coil holder and designed for plugging at least one wire. Additionally disclosed is an apparatus comprising such a magnetic bearing and a method for manufacturing such a magnetic bearing.

15 Claims, 6 Drawing Sheets

(51) Int. Cl.
*H01F 5/02* (2006.01)
*F04D 29/058* (2006.01)
*H01F 7/06* (2006.01)
*H01R 4/2416* (2018.01)

(56) References Cited

U.S. PATENT DOCUMENTS

| | | | |
|---|---|---|---|
| 4,721,935 A | 1/1988 | Gunnels et al. | |
| 5,001,379 A * | 3/1991 | Katayama | H01F 5/04 310/194 |
| 5,319,273 A * | 6/1994 | Hockney | F04D 29/058 310/90.5 |
| 5,924,186 A | 7/1999 | Nakagawa et al. | |
| 6,608,418 B2 * | 8/2003 | Andres | F01D 15/10 310/90.5 |
| 6,849,979 B2 * | 2/2005 | Brunet | F16C 32/0446 310/68 B |
| 2004/0164632 A1 | 8/2004 | Brunet et al. | |
| 2008/0073993 A1 * | 3/2008 | Sortore | F16C 32/0459 310/90.5 |
| 2009/0265038 A1 * | 10/2009 | Ramsey | F16C 32/0442 700/279 |
| 2013/0270945 A1 * | 10/2013 | Ziegler | H02K 21/24 310/90 |
| 2015/0233422 A1 * | 8/2015 | Irino | F16C 32/0461 310/90.5 |

FOREIGN PATENT DOCUMENTS

| | | |
|---|---|---|
| EP | 0003647 A1 | 8/1979 |
| EP | 1162714 A2 | 12/2001 |
| GB | 1172561 A | 12/1969 |
| JP | H11324970 A | 11/1999 |
| WO | 2008/039256 A | 4/2008 |

* cited by examiner

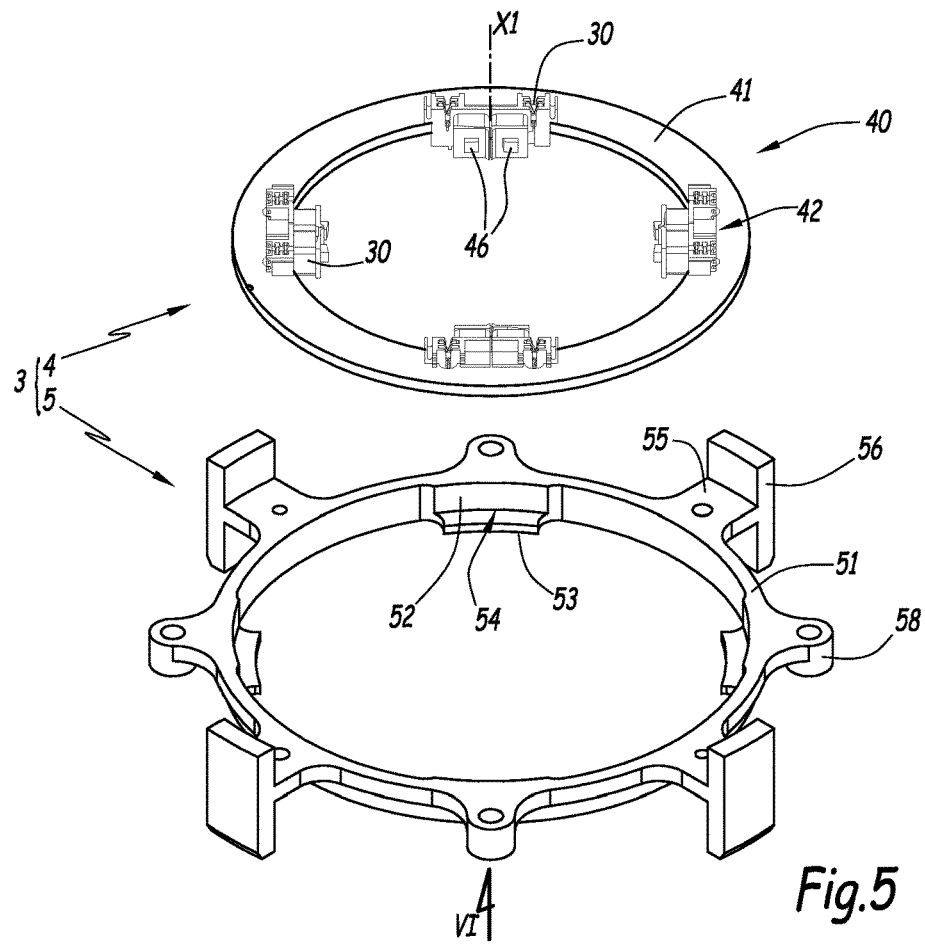
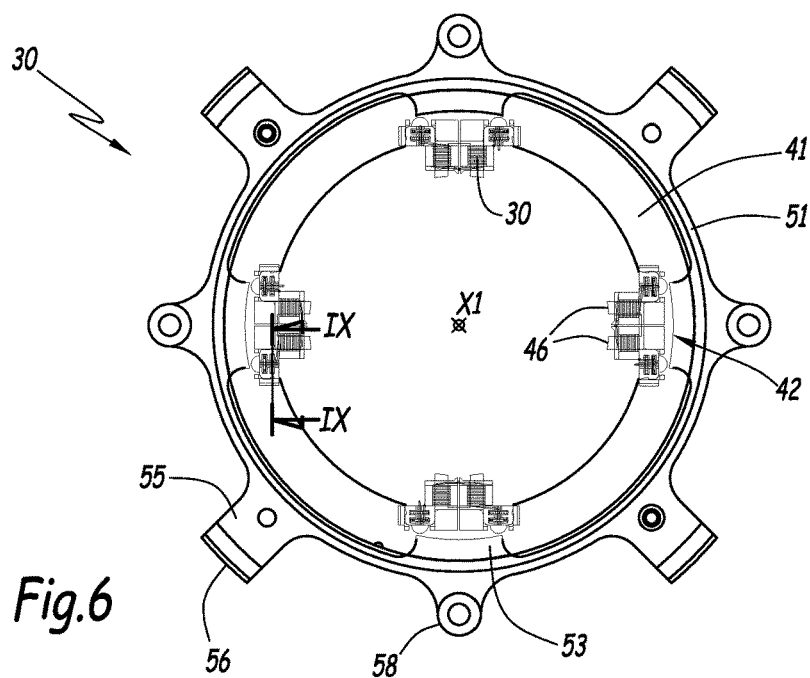

MAGNETIC BEARING, APPARATUS COMPRISING SUCH A MAGNETIC BEARING AND METHOD FOR MANUFACTURING SUCH A MAGNETIC BEARING

CROSS REFERENCE TO RELATED APPLICATIONS

This is a Non-Provisional Patent Application, filed under the Paris Convention, claiming the benefit of Europe (EP) Patent Application Number 14306909.4, filed on 27 Nov. 2014 (27.11.2014), which is incorporated herein by reference in its entirety.

TECHNICAL FIELD OF THE INVENTION

The invention concerns a magnetic bearing. The invention also concerns an apparatus comprising such a magnetic bearing. The invention also concerns a method for manufacturing such a magnetic bearing.

BACKGROUND OF THE INVENTION

In a known manner, magnetic bearings can be integrated to rotating apparatuses, such as flywheels, turbo molecular pumps, turbo expanders, turbo compressors, air blowers, spindles, chillers, etc. For instance, flywheels are designed to store rotational energy. Flywheels equipped with conventional bearings are limited to a revolution rate of a few thousand RPM (revolutions per minute), while flywheels equipped with magnetic bearings can reach up to hundred thousand RPM.

WO-A-2008/039256 discloses an example of magnetic bearing, comprising actuators and sensors. The actuators, formed by electromagnets, are designed to support and position a rotating device, such as a rotating shaft. The sensors are designed to control the operation of the actuators. The magnetic bearing also includes electrical wires for transmitting energy or signals.

Generally, the magnetic actuators and sensors include magnetic coils which are made of copper wire and are wound up around coil holders. Today, methods for manufacturing such magnetic bearings include manual operations. Magnetic coils are wound up manually around the coil holders. Moreover, electrical connections between the magnetic coils are done manually. Furthermore, assembly of the different constitutive parts of the magnetic bearing is done manually. Thus, labor time and cost to manufacture magnetic bearings with those methods are not fully satisfactory, in particular for high production volumes.

SUMMARY OF THE INVENTION

The aim of the invention is to provide an improved magnetic bearing.

To this end, the invention concerns a magnetic bearing, comprising: a magnetic base; at least three actuator bobbins mounted on the magnetic base; and magnetic sensors associated with the actuator bobbins. According to the invention, at least one magnetic system amidst the actuator bobbins and the magnetic sensors comprises together: a coil holder; a coil wound up around the coil holder; and a connector device integrated to the coil holder and designed for plugging at least one wire.

Thanks to the invention, labor time and cost to manufacture the magnetic bearing are reduced. The connector devices are directly integrated to the coil holders, thus allowing easier plugging of wires and connection of magnetic systems with each other. Preferably, the connector devices are configured to avoid welding operations. The overall manufacturing process of the magnetic bearing is simpler and faster.

Advantageously, the coil can be automatically wound up around the coil holder in an automatic winding machine, where the wire constituting the coil is already inserted in the connector. In comparison with manual winding, automatic winding reduces the labor time to manufacture the magnetic bearing and increases the feasibility of high production volumes. Moreover, automatic winding improves the repetitiveness of electrical and magnetic characteristics of actuators and sensors.

According to further aspects of the invention which are advantageous but not compulsory, such a magnetic bearing may incorporate one or several of the following features:
- The coil holder supports a single coil. In particular, the coil holder of the actuator bobbin supports a single coil.
- The coil holder comprises two parallel plates and a central part, the coil being wound up around the central part between the two parallel plates.
- The coil holder comprises two lateral portions, each supporting one coil. In particular, the coil holder of the magnetic sensor supports two coils.
- The coil holder includes a hinge connecting the two lateral portions.
- Each lateral portion of the coil holder comprises two parallel plates and a central part, the coil being wound up around the central part between the two parallel plates.
- The magnetic bearing comprises an actuator sub-assembly including the magnetic base provided with at least three actuator horns, each receiving an actuator coil belonging to one of the actuator bobbins; and a sensor sub-assembly provided with at least three sensor horns, each receiving a sensor coil belonging to one of the magnetic sensors.
- The sensor sub-assembly comprises a detection ring supporting the magnetic sensor and a bracket receiving the detection ring.
- The coil holder of the magnetic actuator includes a recess which extends inside the coil and receives an electromagnet.
- The coil holder includes slots for receiving the connector device.
- The coil holder is made of plastic material.
- The connector device is an insulator displacement connector.
- The connector device is a siameze insulator displacement connector, including similar opposite connection portions for plugging distinct wires.
- The connector device comprises a straight pin and a connection portion for plugging a wire.
- The magnetic bearing comprises four pairs of actuator bobbins.
- The magnetic bearing is a radial active magnetic bearing.
- The magnetic bearing is an axial active magnetic bearing.

The invention also concerns an apparatus, for example a flywheel, a turbo molecular pump, a turbo expander, a turbo compressor, an air blower, a spindle or a chiller, comprising a magnetic bearing as mentioned here-above.

The invention also concerns a method for manufacturing a magnetic bearing as mentioned here-above. The manufacturing method comprises at least the following steps:

a) positioning the coil holder devoid of coil in an automatic winding machine;
b) plugging a first end of a wire destined to form the coil or coils into the coil holder;
c) automatically winding the wire around the coil holder to form the coil or coils;
d) plugging a second end of the wire into the coil holder; and
e) integrating a connector device to the coil holder, such that the wire is automatically plugged into the connector device.

Preferably, the manufacturing method further comprises at least the following steps:
f) implementing steps a) to e) for each actuator bobbin and/or each magnetic sensor of the magnetic bearing;
g) mounting the actuator bobbins on the magnetic base to form an actuator sub-assembly; and
h) assembling the actuator sub-assembly and a sensor sub-assembly to form the magnetic bearing.

BRIEF DESCRIPTION OF THE DRAWINGS

The invention will now be explained in correspondence with the annexed figures, and as an illustrative example, without restricting the object of the invention. In the annexed figures:

FIG. 5 is a perspective view at a larger scale of the sensor sub-assembly of FIG. 2, comprising magnetic sensor bobbins;

FIG. 6 is a bottom view along arrow VI of the assembled sensor sub-assembly of FIG. 5;

DETAILED DESCRIPTION OF SOME EMBODIMENTS

FIGS. 1 to 9 show a magnetic bearing 1 according to the invention and its constitutive elements. More precisely, FIGS. 1 to 9 show the static portion of a radial active magnetic bearing 1, while the rotor portion is not shown for simplification purpose.

Figure 1:
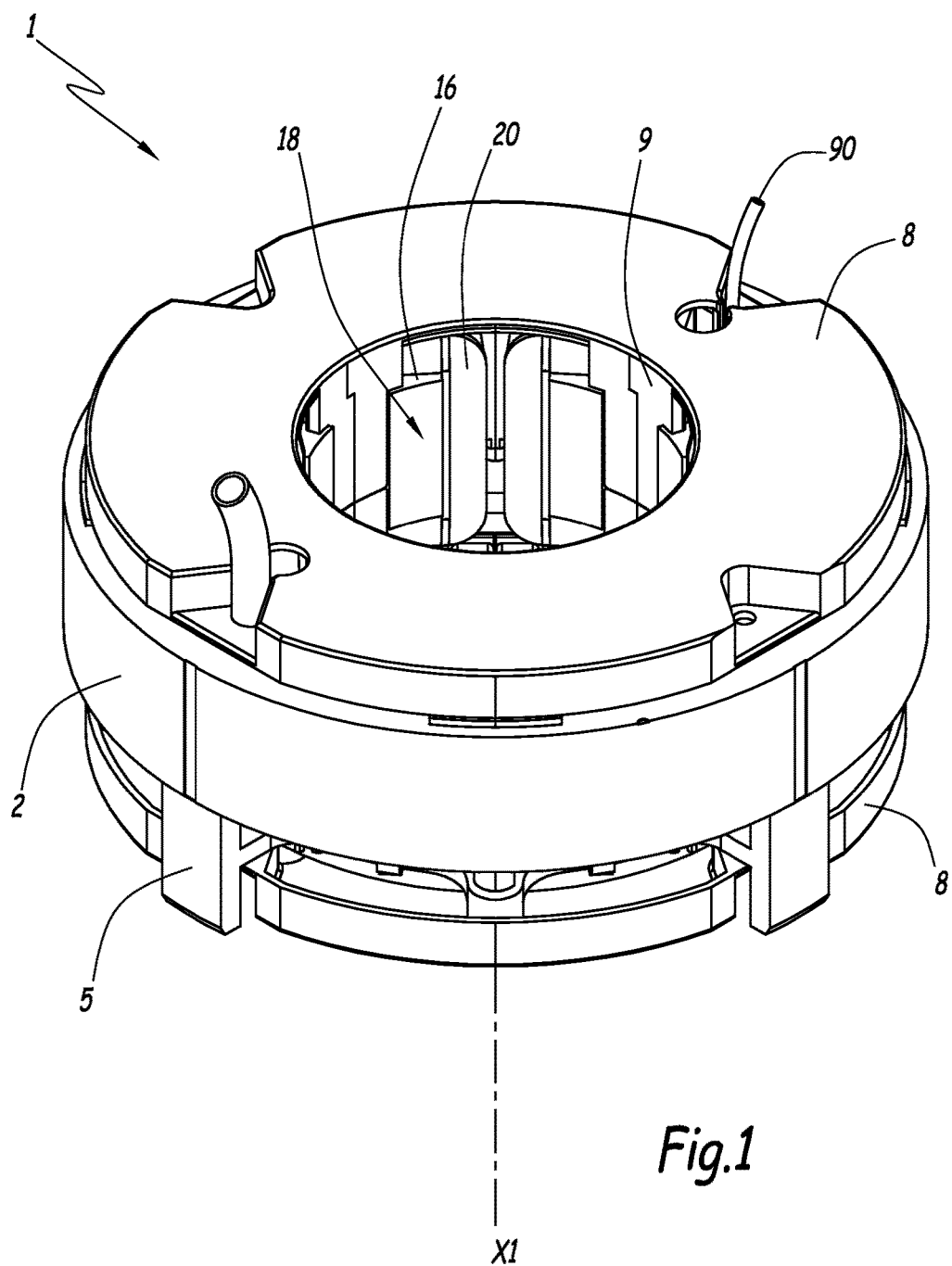
FIG. 1 is a perspective view of a magnetic bearing according to the invention, of the radial type.
Figure 2:
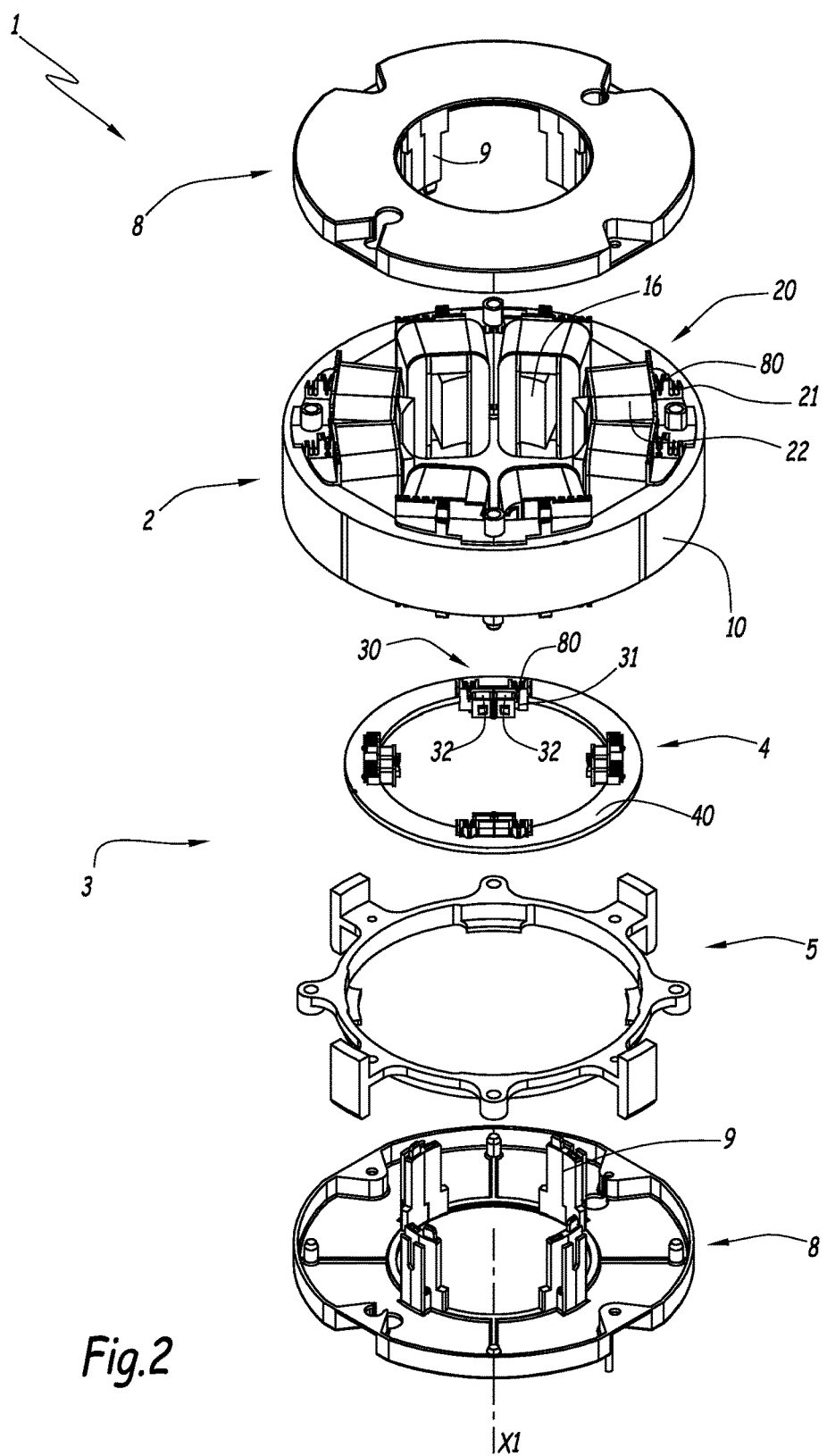
FIG. 2 is an exploded perspective view of the magnetic bearing of FIG. 1, comprising an actuator sub-assembly, a sensor sub-assembly and two cover parts.

As shown on FIGS. 1 and 2, the magnetic bearing 1 is centered on a central axis X1 and comprises an actuator sub-assembly 2, a sensor sub-assembly 3 and two cover parts 8. The magnetic bearing 1 has a modular construction, which makes its manufacturing process simpler and faster. The magnetic bearing 1 also includes electrical wires 90 for transmitting energy or signals. The sub-assemblies 2 or 3 are configured to form magnetic circuits within magnetic bearing 1.

The actuator sub-assembly 2 comprises a magnetic actuator base 10, provided with radially inwardly protruding actuator horns 16. The actuator sub-assembly 2 also comprises magnetic actuator bobbins 20 mounted around the actuator horns 16. The actuator sub-assembly 2 comprises one actuator bobbin 20 per actuator horn 16. The sensor sub-assembly 3 comprises a detection ring 4, comprising a magnetic sensor base 40 provided with radially inwardly protruding sensor horns 46. The detection ring 4 also comprises magnetic sensor bobbins 30 mounted around the sensor horns 46. The detection ring 4 comprises one sensor bobbin 30 per two sensor horns 46. The sensor sub-assembly 3 also comprises a bracket 5 receiving the detection ring 4. The cover parts 8 are provided with interlocking legs 9 for assembly of the magnetic bearing 1.

Figure 3:
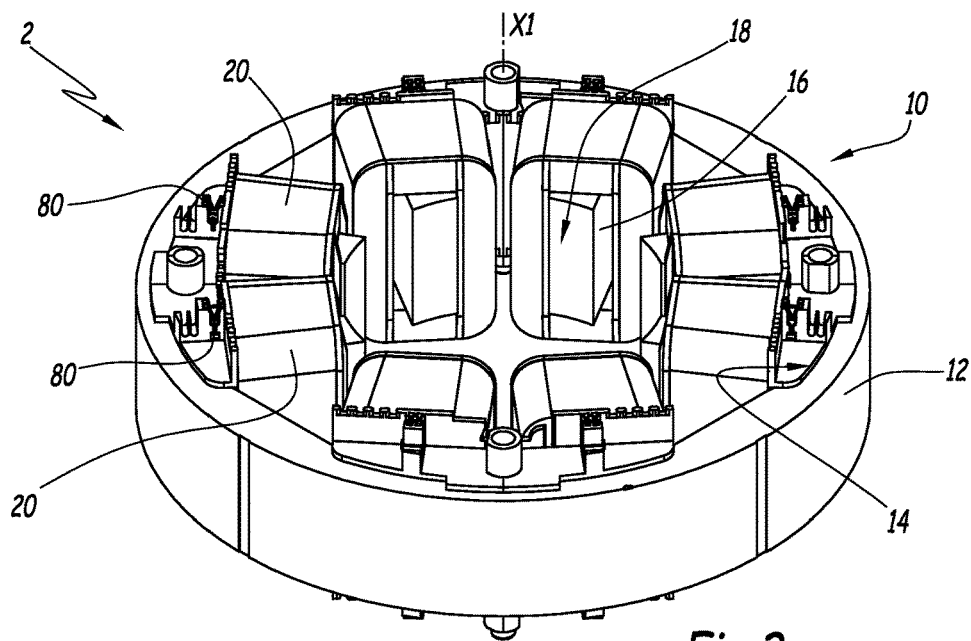
FIG. 3 is a perspective view at a larger scale of the actuator sub-assembly of FIG. 2, comprising magnetic actuator bobbins.
Figure 4:
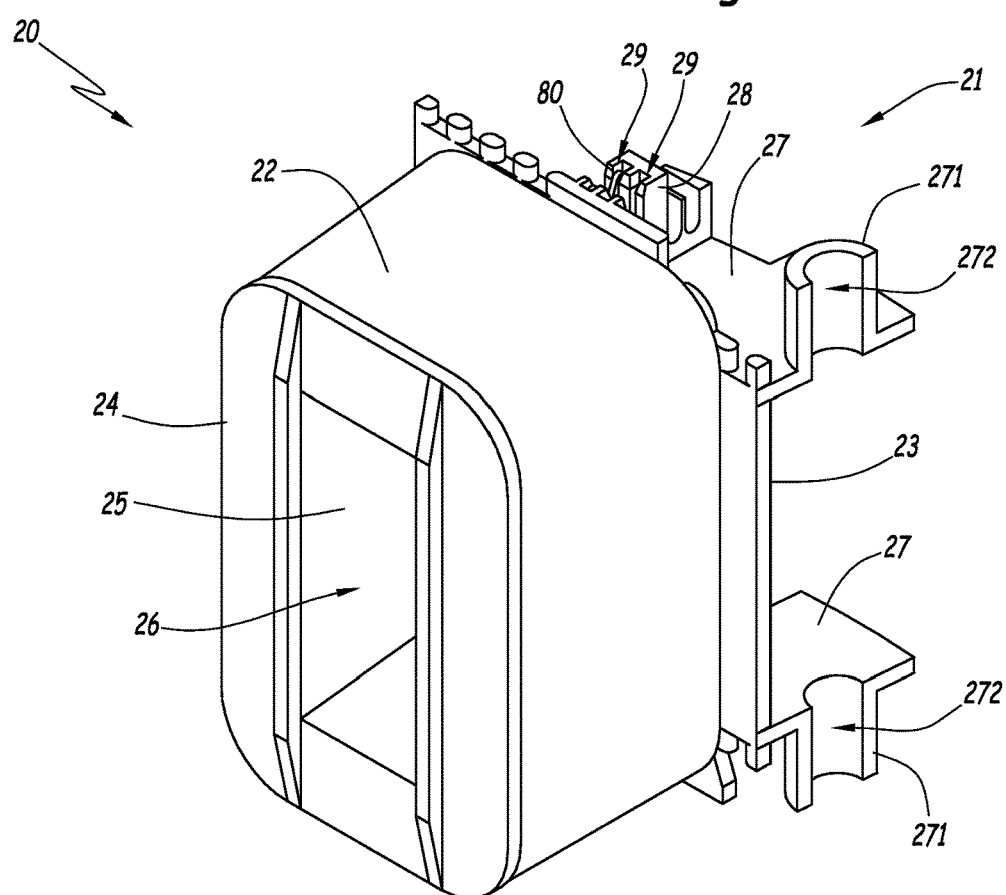
FIG. 4 is another perspective view, at a larger scale, of one magnetic actuator bobbin of FIG. 3.

As shown on FIGS. 3 and 4, the magnetic actuator base 10 comprises a ring 12 centered on axis X1. Base 10 comprises four lodgments 14 provided inside ring 12 for receiving actuator bobbins 20. Two horns 16 extend from ring 12 in each lodgment 14 toward axis X1. In other words, base 10 comprises eight horns 16 distributed along ring 12 and around axis X1. Each horn 16 has a curved inner surface 18 facing axis X1. Together, surfaces 18 are located on a cylinder centered on axis X1 and delimit a space for receiving the rotor portion of the magnetic bearing 1. Base 10 is preferably made of Fe—Si laminated metal stacks forming a unique block of magnetic material. Base 10 is machined to form ring 12, lodgments 14, horns 16 and surfaces 18. Thus, horns 16 are formed integral with ring 12.

Each actuator bobbin 20 comprises a coil holder 21 and a magnetic coil 22 wound up around holder 21. Holder 21 is made of insulating plastic material, preferably polyamide plastic reinforced with 30% glass fibers (PA66 GF30). Coil 22 is made of a single metal wire, preferably of enameled copper.

Holder 21 comprises two parallel plates 23 and 24 connected by a hollow central part 25. Coil 22 is wound up around part 25 between plates 23 and 24. Holder 21 includes a recess 26 which is formed inside part 25 and is open in the middle of each plate 23 and 24. In other words, recess 26 extends through holder 21 and inside coil 22. Recess 26 is designed to receive a horn 16. In the present case, horn 16 and part 25 have rectangular transverse sections. Holder 21 also comprises two rear plates 27 perpendicular to rear plate 23 and axis X1. Each plate 27 comprises a half-cylinder 271 including a half-bore 272. When two holders 21 are coupled, half-cylinders 271 form a complete cylinder and a complete bore for receiving a fastening screw. Holder 21 also comprises a connection portion 28 including two parallel slots 29. Each slot 29 is designed to receive a connector 80, as detailed here-below.

In practice, when an electric current is passed through coil 22, the associated horn 16 is magnetized, thus generating magnetic flux variations, which result in tension variations in coil 22 arranged around holder 21. Magnetic bearing 1 comprises four pairs of horns 16 and four pairs of coils 22 which, in operation form four magnetic circuits.

As shown on FIGS. 5 and 6, the magnetic sensor base 40 comprises a ring 41 centered on axis X1 and four lodgments 42 provided inside ring 41 for receiving sensor bobbins 30. Similarly to actuator base 10, two sensor horns 46 extend from ring 41 in each lodgment 42 toward axis X1. In other words, base 40 comprises eight horns 46 distributed along ring 41 and around axis X1. Each horn 46 has a curved inner surface facing axis X1. Together, the inner surfaces of horns 46 are located on a cylinder centered on axis X1 and delimit a space for receiving the rotor portion of the magnetic bearing 1. Base 40 is preferably made of Fe—Si laminated metal stacks forming a unique block of magnetic material.

Base 40 is machined to form ring 41, lodgments 42 and horns 46. Thus, horns 46 are formed integral with base 40.

Bracket 5 comprises a ring 51 centered on axis X1, four bosses 52 formed inside ring 51 and four protrusions 53 extending from bosses 52 toward axis X1. Bosses 52 and protrusions 53 form lodgments 54 for receiving sensor bobbins 30 when ring 41 is fitted inside ring 51. Bracket 5 also comprises four radial tabs 55 extending from ring 51 opposite axis X1 and four axial slabs 56 extending upwards and downwards from tabs 55 parallel to axis X1. Slabs 56 are designed to receive the bottom of base 10 in contact when sub-assemblies 2 and 3 are positioned between cover parts 8. Bracket 5 also comprises four threaded lugs 58 for receiving fastening screws. Lodgments 54 and slabs 56 are shifted by an angle of 90 degrees around axis X1, while lodgments 54 and lugs 58 are aligned radially to axis X1. Preferably, bracket 5 is made of aluminum alloy.

Figure 7:
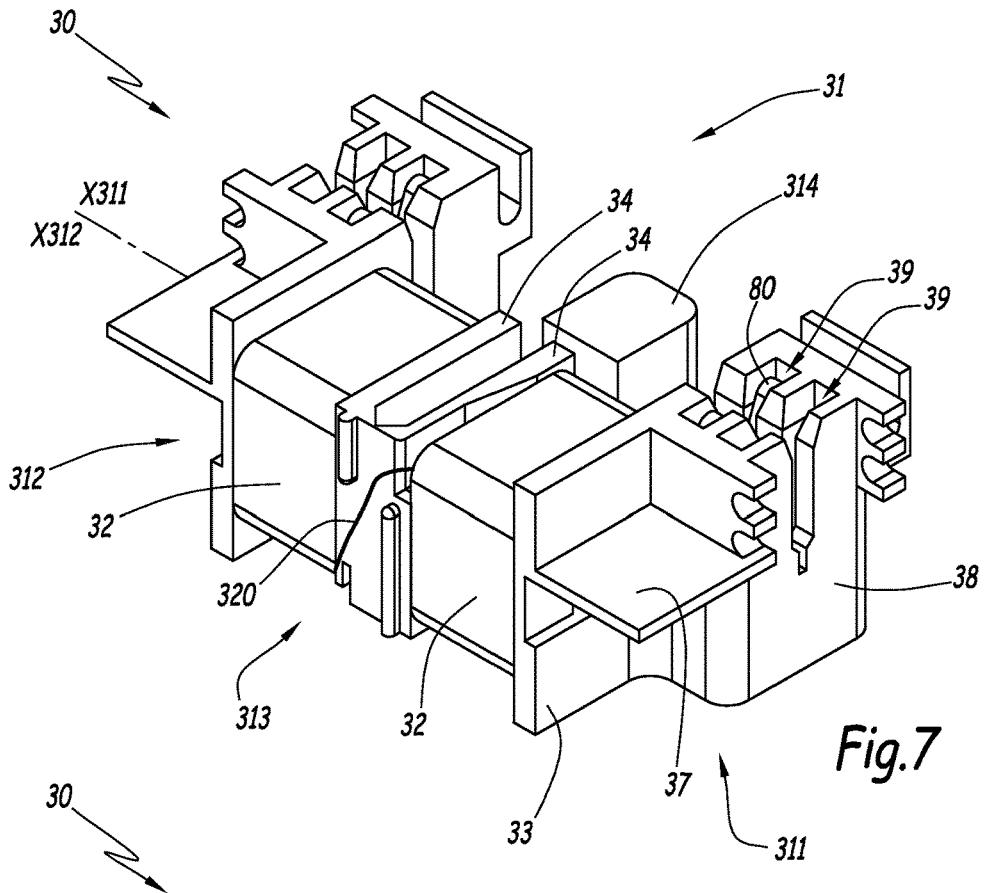
FIGS. 7 and 8 are different perspective views, at a larger scale, of one magnetic sensor bobbin of FIGS. 5 and 6.
Figure 8:
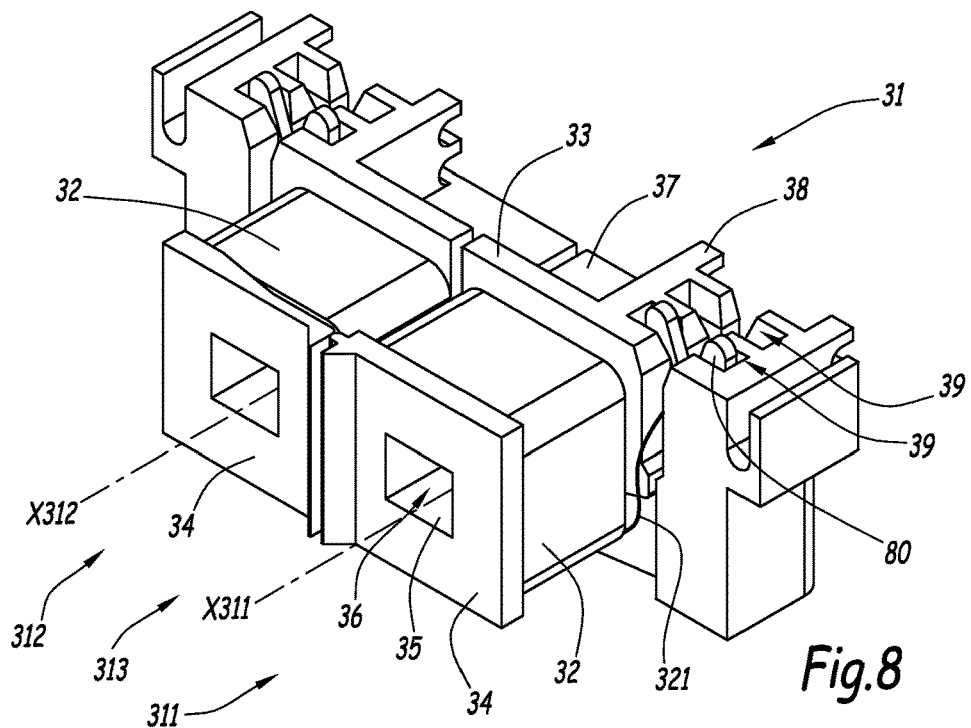

As shown on FIGS. 7 and 8, each sensor bobbin 30 comprises a coil holder 31 and two magnetic coils 32 wound up around holder 31. FIGS. 7 and 8 show holder 31 in different configurations detailed here-below. Holder 31 is made of insulating plastic material, preferably polyamide plastic reinforced with 30% glass fibers (PA66 GF30). Coils 32 are made together of a single metal wire, preferably of enameled copper.

Holder 31 comprises two lateral portions 311 and 312 connected by an intermediate flexible hinge 313. Each portion 311 and 312 comprises two parallel plates 33 and 34 connected by a hollow central part 35. Each coil 32 is wound up around part 35 between plates 33 and 34. Each portion 311 and 312 includes a recess 36 which is formed inside part 35 and is open in the middle of each plate 33 and 34. In other words, recess 36 extends through holder 31 and inside coil 32. Recess 36 is designed to receive a sensor horn 46. Recess 36 of portion 311 has a central axis X311, while recess 36 of portion 312 has a central axis X312. Each portion 311 and 312 also comprises two rear plates 37 perpendicular to rear plate 33. Each portion 311 and 312 also comprises a connection portion 38 including two parallel slots 39. Each slot 39 is designed to receive a connector 80, as detailed here-below.

In practice, each horn 46 is magnetized by the rotation of the rotor, thus generating magnetic flux variations, which result in tension variations in coil 32 arranged around holder 31. Magnetic bearing 1 comprises four pairs of horns 46 and four pairs of coils 32 which, in operation form four magnetic circuits.

The copper wire forming coils 32 extends between them near hinge 313. In other words, the copper wire has an intermediate strand 320 connected between coils 32 beside hinge 313. The copper wire has both ends plugged into two connectors 80, one integrated to portion 311 and one integrated to portion 312.

FIG. 7 shows sensor bobbin 30 at the end of a winding step, with portions 311 and 312 of holder 31 in a first configuration. Plates 34 of portions 311 and 312 are parallel to each other, while axes X311 and X312 are aligned. A plastic lead 314 is formed on plate 34 of portion 311, opposite hinge 313. Plates 37 and/or lead 314 are designed for pretension by a tool of a winding machine. Holder 31 is movable in rotation around axes X311 and X312, so that coils 32 can be automatically wound up around parts 35 of holder 31 at once. The intermediate strand 320 of the copper wire linking coils 32 is shown in front of hinge 311.

FIG. 8 shows sensor bobbin 30 at the beginning of a mounting step, performed after the winding step, with portions 311 and 312 in a second configuration. Portions 311 and 312 have pivoted relative to each other at hinge 313, such that plates 34 of portions 311 and 312 are aligned with each other, while axes X311 and X312 are parallel. Lead 314 has been removed. An end 321 of the copper wire is shown, plugged into connector 80 integrated to portion 311. In this configuration, sensor bobbin 30 can be mounted on base 40.

In practice, sensors formed by bobbins 30 and horns 46 are designed to control the operation of actuators formed by bobbins 20 and horns 16. Sensor bobbins 30 are linked to a control unit, not represented for simplification purpose. When the magnetic bearing 1 is mounted, each sensor coil 32 is positioned next to an actuator coil 22 along an axial direction defined by axis X1. Horns 16 and 46, actuator coils 22 and sensor coils 32 are coupled by pairs, thus allowing radial position control of the rotor portion of the magnetic bearing 1.

Figure 9:
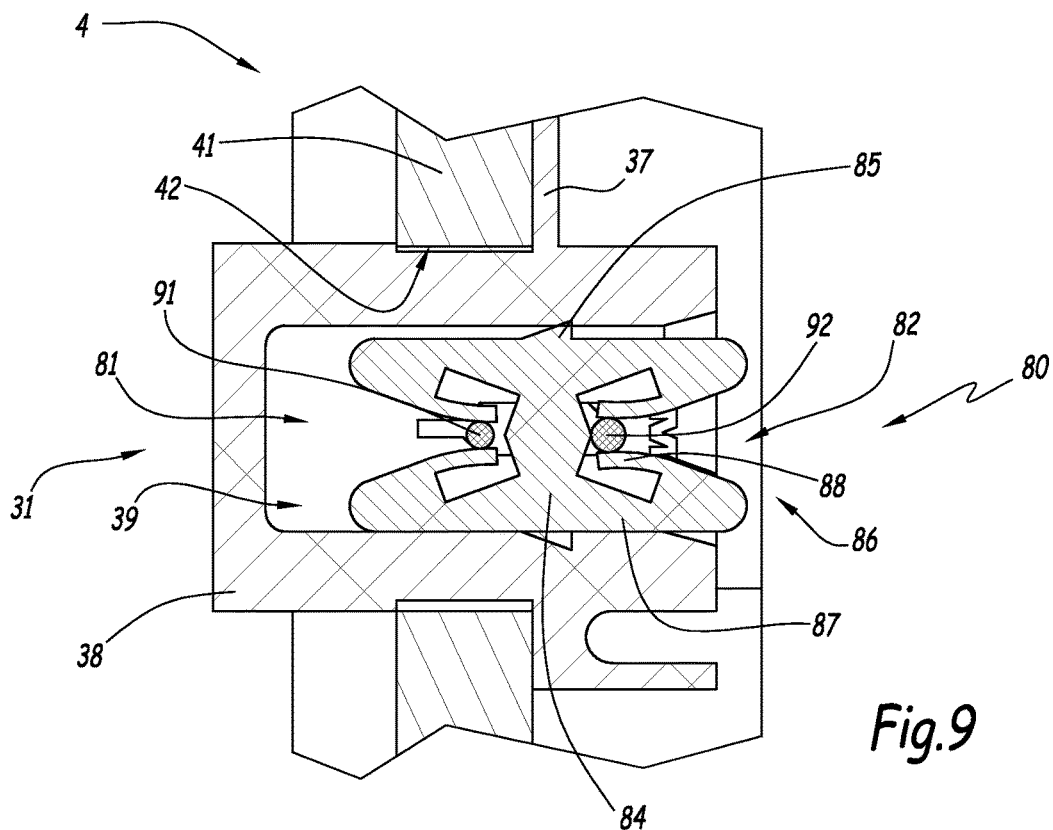
FIG. 9 is a partial sectional view along line IX-IX of FIG. 6, showing a connector device.

As shown on FIG. 9, connector 80 is designed for plugging two distinct wires 91 and 92. More precisely, connector 80 is designed for receiving and automatically restraining wires 91 and 92, without welding operation. Wire 91 is an enameled wire designed to form coils 32 wound up around holder 31. FIG. 8 shows end 321 of wire 91. Wire 92 is a sheathed wire designed to connect nearby sensor bobbins 30 with each other. Slot 39 receives wire 91 first, then connector 80, then wire 92.

Connector 80 is a siameze insulator displacement connector, including similar opposite connection portions 81 and 82 for plugging wires 91 and 92. Connector 80 is made of conductive metal alloy, preferably brass, more precisely post tin plated brass. Connector 80 is integrated to the coil holder 31 by fitting in slot 39 designed thereto. Portion 81 is oriented toward the bottom of slot 39, while portion 82 is oriented opposite the bottom of slot 39, i.e. toward the entry of slot 39. Portions 81 and 82 are connected by an intermediate portion 84 provided with lateral fins 85 for locking in slot 39. Each portion 81 and 82 comprises two lateral tabs 86, each including a lateral rigid element 87 and a central pinching element 88. Pinching elements 88 are elastically deformed when wire 91 or 92 is inserted between them. When connector 80 is inserted into slot 39, wire 91 is automatically received and restrained between tabs 86. Advantageously, enameled wire 91 can be automatically stripped, i.e. enamel is locally removed from the wire core, when wire 91 is received between tabs 86.

The invention also concerns a method for manufacturing the magnetic bearing 1.

The manufacturing method comprises at least the following successive steps a), b), c), d) and e).

Step a) consists in positioning a coil holder 21 or 31 devoid of coil 22 or 32 in an automatic winding machine. Step b) consists in plugging a first end of a wire 91 destined to form coil 22 or coils 32 into coil holder 21 or 31, more precisely into a slot 29 or 39. Step c) consists in automatically winding the wire 91 around the coil holder 21 or 31 to form the coil 22 or 32. Coil holder 21 is hold by the winding machine by plate 23, within recess 26 and/or by plates 24. Coil holder 31 is hold by the winding machine by plates 33, within recess 36 and/or by plates 34. When the winding is finished, step d) consists in plugging the other end of the wire 91 into the coil holder 21 or 31, more precisely into another slot 29 or 39. Advantageously, steps b) and d) can be implemented automatically by the winding machine.

Step e) consists in integrating at least one connector device 80 to the coil holder 21 or 31, more precisely in a slot 29 or 39, such that the wire 91 is automatically plugged into the connector device 80. In practice, the coil holder 21 and 31 can receive several connector devices 80 in its slots 29 or 39. Advantageously, thanks to the connector device 80, an insulator belonging to the wire 91 can be locally removed from the wire core. Preferably, at this stage, the connector device 80 is designed to receive a second wire 92.

In comparison with manual winding, automatic winding reduces the labor time to manufacture the magnetic bearing and increases the feasibility of high production volumes. Moreover, automatic winding improves the repetitiveness of electrical and magnetic characteristics of actuators and sensors.

Furthermore, the manufacturing method usually comprises at least the following steps f), g) and h). Step f) consists in implementing steps a) to e) for each actuator bobbin 20 and/or each sensor bobbin 30 of the magnetic bearing 1, preferably for each actuator bobbin 20 and each sensor bobbin 30 of the magnetic bearing 1. Step g comprises two sub-steps g1) and g2). Sub-step g1) consists in mounting each actuator bobbin 20 on the magnetic actuator base 10, with each actuator coil 22 mounted on its associated horn 16, to form the actuator sub-assembly 2. Sub-step g2) consists in mounting each sensor bobbin 30 on the magnetic sensor base 40, with each sensor coil 32 mounted on its associated horn 46, to form the sensor sub-assembly 3. Step h) consists in assembling sub-assemblies 2 and 3 to form the magnetic bearing 1.

Figure 10:
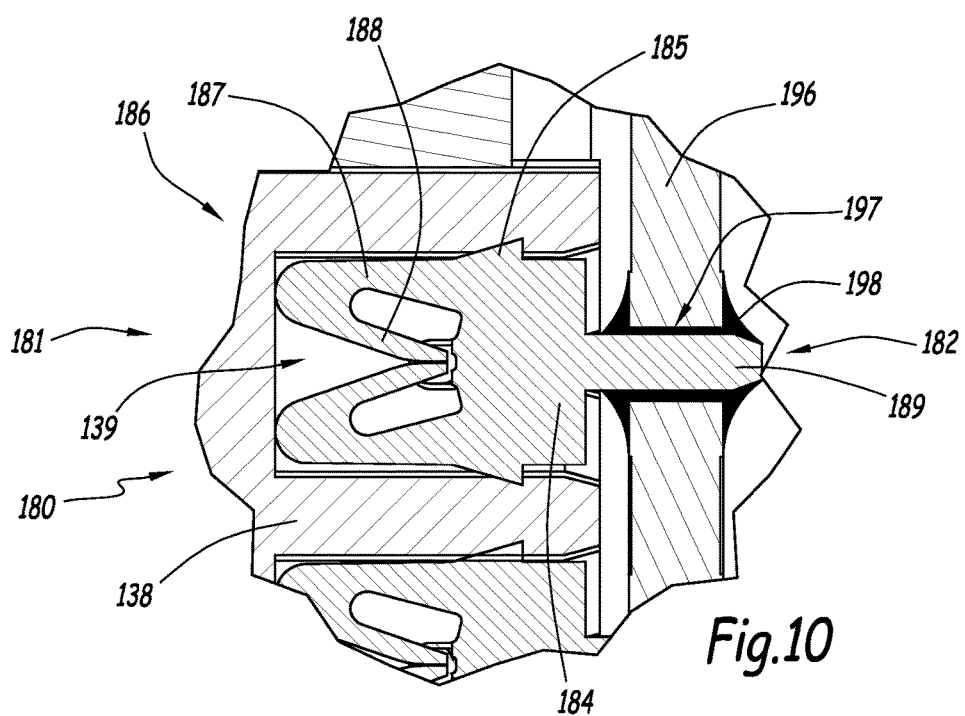
FIG. 10 is a sectional view similar to FIG. 9, showing a second embodiment of a connector device.

A second embodiment of a connector 180 is represented on FIG. 10. Elements similar to the first embodiment of FIG. 9 have references increased by 100. Only the differences with respect to the first embodiment are described hereafter.

Connector 180 is an insulator displacement connector. Connectors 180 includes a first connection portion 181 similar to portion 81 and a second connection portion 182 provided with a straight pin 189. Connector 180 comprises an intermediate portion 184 provided with lateral fins 185. Connection portion 181 comprises two lateral tabs 186, each including a lateral rigid element 187 and a central pinching element 188. Connection portion 181 is designed for plugging a wire, not represented for simplification purpose, between pinching elements 188. Connection portion 182 is designed for plugging into a printed circuit board 196 provided with a bore 197. Pin 189 is inserted into bore 197 then welded to board 196 by a weld 198.

Alternately, coil holders 21 and 31 may integrate any connector devices adapted to the present application, other than connectors 80 or 180. Whatever the type of connector device, it is integrated to one of coil holders 21 or 31, thus allowing easier plugging of wires and connection of magnetic systems 20 or 30 with each other.

Other non-shown embodiments can be implemented within the scope of the invention.

According to a non-shown embodiment, the magnetic bearing may have an axial configuration instead of a radial configuration.

According to another non-shown embodiment, the magnetic bearing 1 may include a different number of horns 16 and 46, actuator coils 22 and sensor coils 32. Preferably, the magnetic bearing 1 includes pairs of horns 16 and 46, receiving pairs of coils 22 and 32. In practice, the magnetic bearing 1 includes the same number of horns 16 and 46, actuator coils 22 and sensor coils 32. In other words, each actuator coil 22 is associated with a sensor coil 32.

According to another non-shown embodiment, actuator bobbins 20 may have a holder 21 including two portions for holding two coils 22, like holder 31 includes two portions 311 and 312 for holding two coils 32. In this case, the two actuator coils 22 are associated with two sensor coils 32.

According to another non-shown embodiment, sensor bobbins 30 may have a holder 31 supporting only one coil 32, like holder 21 supports only one coil 22. In this case, two sensor coils 32 belonging to two sensor bobbins 30 are associated with two actuator coils 22.

According to another non-shown embodiment, the magnetic sensors equipping the magnetic bearing 1 may have a configuration different from a sensor bobbin 30 as described above.

Whatever the embodiment of the invention, the magnetic bearing 1 comprises a magnetic base 10; at least three actuator bobbins 20 mounted on the magnetic base 10; and magnetic sensors 30 associated with the actuator bobbins 20. According to the invention, at least one magnetic system amidst actuator bobbins 20 and magnetic sensors 30 comprises the following elements, forming together a single assembly: a coil holder, a coil wound up around the coil holder, and a connector device integrated to the coil holder and designed for plugging at least one wire. Preferably, all actuator bobbins 20 and magnetic sensors 30 of the magnetic bearing 1 are designed along the above lines.

In addition, technical features of the different embodiments can be, in whole or part, combined with each other. Thus, the magnetic bearing 1 and its manufacturing method can be adapted to the specific requirements of the application.

What is claimed is:
1. A magnetic bearing, comprising:
a magnetic base;
at least three actuator bobbins mounted on the magnetic base; and
magnetic sensors associated with the actuator bobbins;
wherein at least one magnetic system amidst the actuator bobbins and the magnetic sensors comprises together:
a coil holder;
a coil wound up around the coil holder; and
a connector device integrated to the coil holder and designed for plugging at least one wire,
wherein the connector device is a siameze insulator displacement connector comprising similar opposite connection portions for plugging distinct wires and comprising a conductive metal alloy, the connector device being integrated to the coil holder by fitting in a slot thereof.
2. The magnetic bearing according to claim 1, wherein the coil holder supports a single coil.
3. The magnetic bearing according to claim 2, the coil holder further comprising two parallel plates and a central part,
wherein the coil is wound up around the central part between the two parallel plates.
4. The magnetic bearing according to claim 1, the coil holder further comprising two lateral portions,
wherein each lateral portion supports one coil.
5. The magnetic bearing according to claim 4, the coil holder further comprising a hinge connecting the two lateral portions.
6. The magnetic bearing according to claim 4, each lateral portion of the coil holder further comprising two parallel plates and a central part,
wherein the coil is wound up around the central part between the two parallel plates.
7. The magnetic bearing according to claim 1, comprising:

an actuator sub-assembly including the magnetic base provided with at least three actuator horns, each receiving an actuator coil belonging to one of the actuator bobbins; and a sensor sub-assembly provided with at least three sensor horns, each receiving a sensor coil belonging to one of the magnetic sensors.

8. The magnetic bearing according to claim 1, the coil holder further comprising slots for receiving the connector device.

9. The magnetic bearing according to claim 1, wherein the connector device is an insulator displacement connector designed for receiving and automatically restraining at least one wire.

10. The magnetic bearing according to claim 9, the connector device further comprising a straight pin and a connection portion for plugging a wire.

11. The magnetic bearing according to claim 1, further comprising four pairs of actuator bobbins.

12. The magnetic bearing according to claim 1, wherein the magnetic bearing is integrated into a rotary apparatus.

13. The magnetic bearing according to claim 12, wherein the rotary apparatus is one of:

a flywheel, a turbo molecular pump, a turbo expander, a turbo compressor, an air blower, a spindle or a chiller.

14. A method for manufacturing a magnetic bearing, the magnetic bearing comprising:

a magnetic base;

at least three actuator bobbins mounted on the magnetic base; and magnetic sensors associated with the actuator bobbins;

wherein at least one magnetic system amidst the actuator bobbins and the magnetic sensors comprises together:

a coil holder;

a coil wound up around the coil holder; and a connector device integrated to the coil holder and designed for plugging at least one wire, wherein the connector device is a siameze insulator displacement connector comprising similar opposite connection portions for plugging distinct wires and comprising a conductive metal alloy, the connector device being integrated to the coil holder by fitting in a slot thereof, the method comprising steps of:

positioning the coil holder devoid of coil in an automatic winding machine;

plugging a first end of a wire destined to form the coil or coils into the coil holder;

automatically winding the wire around the coil holder to form the coil or coils;

plugging a second end of the wire into the coil holder; and integrating a connector device to the coil holder by fitting in the slot thereof, such that the wire is automatically plugged into the connector device.

15. The method according to claim 14, further comprising steps of:

implementing steps a) to e) for at least one of each actuator bobbin and each magnetic sensor of the magnetic bearing;

mounting the actuator bobbins on the magnetic base to form an actuator sub-assembly; and assembling the actuator sub-assembly with a sensor sub-assembly to form the magnetic bearing.

* * * * *